United States Patent
Jiang et al.

(10) Patent No.: US 8,626,982 B2
(45) Date of Patent: Jan. 7, 2014

(54) DYNAMICALLY CONFIGURABLE WIRELESS DATA BUS SWITCH FOR COUPLING A DATA BUS TO A WIRELESS LINK

(75) Inventors: James (Weijun) Jiang, San Diego, CA (US); Shawn Ding, San Diego, CA (US); Aimin (Justin) Sang, San Diego, CA (US); Gang Lu, Pleasanton, CA (US); Tae Yang, Irvine, CA (US); Yuan Zhuang, San Diego, CA (US); Hongyu Xie, San Diego, CA (US); Simon (Yu) Zhang, San Jose, CA (US); Roy Tobin, San Diego, CA (US); Brima Ibrahim, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 169 days.

(21) Appl. No.: 13/172,060

(22) Filed: Jun. 29, 2011

(65) Prior Publication Data

US 2013/0007335 A1 Jan. 3, 2013

(51) Int. Cl.
*G06F 13/00* (2006.01)
*G06F 13/40* (2006.01)

(52) U.S. Cl.
CPC .................................. *G06F 13/4022* (2013.01)
USPC ........................................... 710/316; 710/314

(58) Field of Classification Search
USPC ....................... 710/305–317, 104–110, 8–19; 709/220–222
See application file for complete search history.

(56) References Cited

U.S. PATENT DOCUMENTS

| 2008/0008188 | A1* | 1/2008 | Buga et al. ............... 370/395.21 |
| 2008/0168189 | A1* | 7/2008 | Aldaz et al. ..................... 710/22 |
| 2008/0288705 | A1 | 11/2008 | Tamir |
| 2009/0094506 | A1 | 4/2009 | Lakkis |
| 2012/0195296 | A1* | 8/2012 | Adachi et al. ................. 370/338 |
| 2012/0324139 | A1* | 12/2012 | Glaser ........................... 710/312 |

FOREIGN PATENT DOCUMENTS

WO    WO 99/53668    10/1999

* cited by examiner

*Primary Examiner* — Raymond Phan
(74) *Attorney, Agent, or Firm* — Farjami & Farjami LLP (57) ABSTRACT

Provided is a dynamically configurable wireless data bus switch for coupling a data bus to a wireless link. For example, there is a dynamically configurable wireless data bus switch including a configurable protocol adaption layer data plane providing a first interface to a data bus and a processor configured to execute a protocol adaption layer control plane. The configurable protocol adaption layer data plane of the dynamically configurable wireless data bus switch is coupled to the processor and is dynamically configurable by the protocol adaption layer control plane.

20 Claims, 6 Drawing Sheets

DYNAMICALLY CONFIGURABLE WIRELESS DATA BUS SWITCH FOR COUPLING A DATA BUS TO A WIRELESS LINK

BACKGROUND OF THE INVENTION

1. Field of the Invention

The present invention relates generally to data bus switches. More particularly, the present invention relates to wireless data bus switches.

2. Background Art

As electronic devices have become smaller and thus more mobile, there is an increasing demand for wireless data transmission systems to operate with ever increasing performance statistics. In particular, as data storage for electronic devices has become more compact, synchronizing large collections of data wirelessly has become unduly tiresome due to low data throughputs and limited battery life. For manufacturers endeavoring to meet the consumer demand, this has translated to high development costs associated with customized solutions that are often error prone and typically short lived due to incompatibility issues.

To address these concerns, there have been attempts to develop wireless extensions to various standardized data buses typically found in a personal computer. Unfortunately, conventional methods have characteristically been very similar to the customized solutions already attempted, which incorporate undesirable traits such as low data throughputs, high power consumption, high development costs, limited utility, and dubious product lifetime.

Accordingly, there is a need to overcome the drawbacks and deficiencies in the art by providing systems and methods for coupling a wireless link to a data bus using a dynamically configurable data bus switch that can be implemented in a variety of contexts yet be capable of high data throughputs.

SUMMARY OF THE INVENTION

The present application is directed to a dynamically configurable wireless data bus switch, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a dynamically configurable wireless data bus switch. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
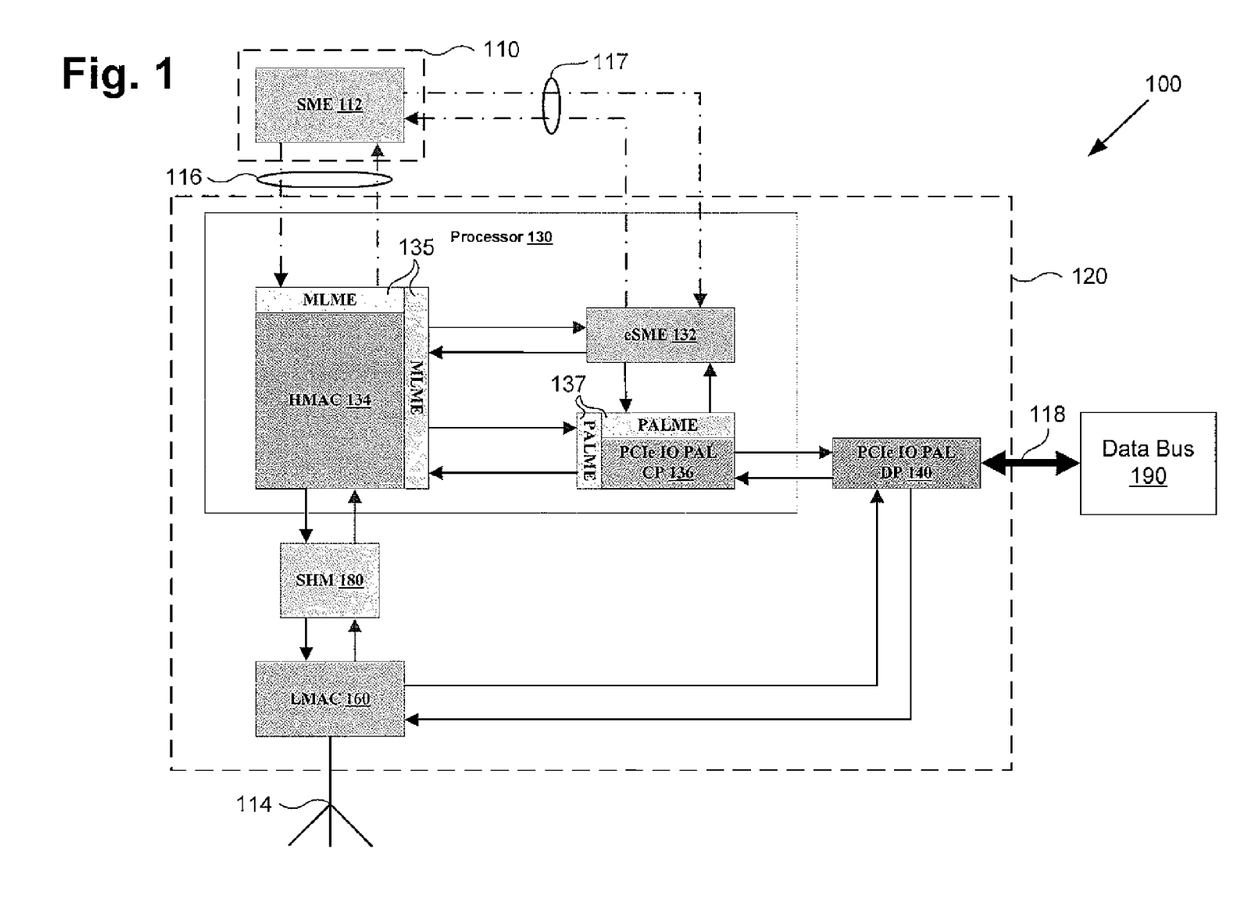
FIG. 1 presents a diagram of a dynamically configurable wireless data bus switch, according to one embodiment of the present invention.

FIG. 1 shows system 100 illustrating an embodiment of the present inventive concepts addressing the concerns described above. As shown in FIG. 1, system 100 includes host central processing unit (CPU) 110 coupled to wireless data bus switch 120, which is in turn coupled to wireless link 114 and data bus 190. Host CPU 110 may comprise any processor external to wireless data bus switch 120, for example, that can be configured to execute station management entity (SME) 112 in addition to other host-level processes. SME 112 may comprise an updateable software logical module that can be executed by host CPU 110, for example, and may be configured to provide an interface for users to administer, configure, provision, and collect various statistics from wireless data bus switch 120, for instance. A more extensive description of a functionality of SME 112 is provided below. As shown in FIG. 1, host CPU 110 may be coupled to wireless data bus switch 120 over one or more data links, for example, such as data links 116 and 117. For instance, data link 116 may represent a data link formed over a peripheral component interconnect express data bus, for example, and data link 117 may represent a separate universal asynchronous receiver/transmitter (UART) data link. In some embodiments, host CPU 110 may reside in a host computer, for example, where wireless data bus switch 120 is coupled to the host computer comprising host CPU 110.

Wireless data bus switch 120 of FIG. 1 may comprise a dynamically configurable wireless data bus switch able to couple data bus 190 to wireless link 114, as will be described more fully below. In particular, wireless data bus switch 120, as shown in FIG. 1, may comprise processor 130 and configurable protocol adaption layer data plane (PALDP) 140, and, in some embodiments, may include lower medium access control (LMAC) 160 and shared memory (SHM) 180. Processor 130 may comprise any processor that can be configured to execute embedded SME (eSME) 132, higher MAC (HMAC) 134, MAC sub-layer management entity (MLME) 135, PAL control plane (PALCP) 136 and PAL management entity (PALME) 137, for example, and be coupled to PALDP 140, LMAC 160 and SHM 180. For instance, processor 130 may comprise any input/output processor (IOP), for example, or any general purpose processor. In some embodiments, processor 130 may comprise an ARM processor, for example. Furthermore, in some embodiments, processor 130 may be coupled to configurable PALDP 140 using a dedicated first in first out (FIFO) and SHM 180, for example, and configurable PALDP 140 may be coupled to LMAC 160 using a specialized buffer pool.

eSME 132, similar to SME 112, may comprise an updateable software logical module, for example, that may be configured to provide an interface for administering, configuring, provisioning, and collecting various statistics with respect to wireless data bus switch 120, for example, but unlike SME 112, eSME 132 may be executed by processor 130, as shown in FIG. 1. A more extensive description of a functionality of eSME 132 is provided below.

HMAC 134 and MLME 135 may also comprise updateable software logical modules that are executed by processor 120, for example, and may be configured to provide management functionality for one or more wireless links coupled to an associated LMAC, such as wireless link 114 coupled to LMAC 160 for example. For instance, HMAC 134 and MLME 135 may be configured to manage wireless network integration, for example, as well as encryption, some power reduction, and other scheduling and management functions for, for example, LMAC 160. As shown in FIG. 1, MLME 135 may be configured to manage interfacing HMAC 134 with, for example, SME 112 and all portions of wireless data bus switch 120.

PALCP 136 and PALME 137 may comprise updateable software logical modules that are executed by processor 130, for example, and may be configured to process various control packets as well as to manage the various interfaces among SME 112, eSME 132, HMAC 134, LMAC 160 and configurable PALDP 140. In addition, PALCP 136 and PALME 137 may be configured to manage power saving by powering down LMAC 160 and/or configurable PALDP 140 when data is not being transmitted. A more extensive description of a functionality of PALCP 136 is provided below.

Configurable PALDP 140 of wireless data bus switch 120 may comprise a configurable hardware module residing in wireless data bus switch 120, for example, and may be configured to provide an interface to data bus 190. In particular, configurable PALDP 140 may be configured to process data packets transmitted between wireless link 114 and data bus 190, for example, and may be additionally configured to process control packets transmitted between wireless link 114 and processor 130. For example, data packets transmitted between wireless link 114 and data bus 190 may comprise PAL data packets between wireless link 114 and configurable PALDP 140, for example, and may comprise data bus data packets between PALDP 140 and data bus 190. Thus, in one embodiment, configurable PALDP 140 may be configured to translate data bus data packets into PAL data packets to facilitate seamless and high speed data transmissions between devices coupled to data bus 190, or end points (not shown in FIG. 1), and other wireless data bus switches coupled to wireless data bus switch 120 over wireless link 114, for example.

By contrast, control packets may comprise PAL control packets, for example, that may be used to transmit management and control data, such as configuration directives, quality of service (QoS) directives and measurement statistics, for example, between wireless data bus switches, such as wireless data bus switch 120 for example. Thus, in one embodiment, configurable PALDP 140 may be configured to distinguish control packets from data packets and direct control packets to processor 130 and any of the software modules executing therein. As with SME 112, eSME 132 and PALCP 136 above, a more extensive description of a functionality of configurable PALDP 140 is provided below.

Also shown in FIG. 1 are LMAC 160 providing an interface to wireless link 114, SHM 180, and data bus link 118 coupling data bus 190 to configurable PALDP 140. LMAC 160 may comprise any physical layer or layers (PHY) capable of coupling to configurable PALDP 140, for example, and supporting one or more wireless links, such as wireless link 114 for example. As such, LMAC 160 may comprise any PHY capable of providing an interface to one or more wireless links for wireless data bus switch 120. For instance, LMAC 160 may be a hardware module configured to support wireless data transmissions over 2.4 GHz, 5 GHz and 60 GHz wireless links, for example, and support a wide variety of wireless transmission protocols, such as 802.11 based wireless transmission protocols for example, used to communicate wirelessly with other wireless devices. Utilizing any of such protocols, LMAC 160 may be configured to transceive data packets and/or control packets for configurable PALDP 140.

In some embodiments, functionality of LMAC 160 may be managed, at least in part, by HMAC 134. LMAC 160 may be configured to support various modulation and coding schemes, for example, that are managed by HMAC 134, for instance, to help support high data throughput, power reduction, and other functionality depending on a particular need. Such functionality may be configured at an initialization of wireless data bus switch 120, for example, or may be dynamically configurable after an initialization of wireless data bus switch 120. In some embodiments, LMAC 160 may be configured to support multiple wireless links substantially simultaneously, for example, or to support multiple wireless links sequentially, for instance, to increase reliability, extend effective wireless range, and the like.

SHM 180 may comprise any memory module or architecture, for example, that is capable of being coupled to processor 120, LMAC 160 and/or configurable PALDP 140. In some embodiments, SHM 180 may be coupled to one or more software modules in processor 130, for example, and may be coupled directly or indirectly to any software or hardware modules situated within wireless data bus switch 120.

As noted above, configurable PALDP 140 may be configured to provide an interface to data bus 190, where data bus link 118 may be used to couple data bus 190 to configurable PALDP 140, for example. As such, in some embodiments, configurable PALDP 140 may be configured to transmit data both to data bus link 118 and to data bus 190. For example, in one embodiment, data bus 190 may comprise a peripheral component interface express (PCIe) data bus, for example, and data bus link 118 may comprise a root complex for the PCIe data bus. As such, configurable PALDP 140 may be configured to transmit data both to the root complex of a PCIe bus and to devices attached to a PCIe data bus. Thus, configurable PALDP may transmit data to, for example, a bus controller for a PCIe data bus and to the PCIe data bus itself to facilitate seamless data transmissions between end points coupled to data bus 190 and other end points coupled to other wireless data bus switches, for example, coupled to wireless data bus switch 120 over wireless link 114. Thus, in some embodiments, wireless data bus switch 120 may be configured to form at least a part of a seamless wireless extension of a PCIe data bus. It should be understood that data bus 190 may comprise other data buses, for example, such as a universal serial bus (USB), an industry standard architecture (ISA) data bus, or legacy PCI bus.

Although FIG. 1 depicts wireless data bus switch 120 as comprising multiple hardware modules, in some embodiments, any of processor 130, configurable PALDP 140, LMAC 160 and/or SHM 180 may integrated into the same semiconductor die. Moreover, in other embodiments, wireless data bus switch may comprise only processor 130 and configurable PALDP 140, where LMAC and shared memory functionality are implemented outside wireless data bus switch 120.

As explained above, configurable PALDP 140 may be configured to translate data bus data packets into PAL data packets to facilitate seamless and high speed data transmissions between end points coupled to data bus 190 and other end points coupled to, for example, other wireless data bus switches. For example, when incorporating 60 GHz wireless link capability, embodiments of wireless data bus switch 120 may provide wireless data transmission between end points up to approximately 7 Gbps. However, in addition to its high speed data transmission capability, wireless data bus switch 120 also provides a dynamically configurable platform that may be used in a variety of contexts without requiring costly redesign and that may be updated to confront typical issues found in an evolving technology. For example, wireless data bus switch 120 may be configured to support both a host PAL (HPAL) mode and a device PAL (DPAL) mode that may be selected dynamically or at initialization, for example, which allows embodiments of the present inventive concepts to be quickly implemented into both host and non-host devices. Moreover, through use of SMEs such as SME 112 and/or eSME 132, embodiments of the present inventive concepts may collaborate to form efficient and high speed wireless data bus extensions for a variety of data buses and end point applications with very little development overhead.

For instance, in some embodiments, eSME 132 may additionally be configured to detect when wireless data bus switch 120 is coupled to a host device, such as a host computer, for example, by detecting a presence of host CPU 110 or SME 112, for instance. Upon such detection, eSME 132 may be configured to place wireless data bus switch 120 into an HPAL mode. While in an HPAL mode, and in addition to the functionality described above, SME 112 and eSME 132 of wireless data bus switch 120 may be configured to collaborate and manage HMAC 134, LMAC 160, PALCP 136 and PALDP 140, to provision various access policies, and to dynamically allocate bandwidth for any DPAL mode switches in a wireless domain managed by wireless data bus switch 120 according to wireless link conditions, current workload on wireless data bus switch 120, and characteristics of each DPAL mode switch in the wireless domain. As such, SME 112 and eSME 132 of wireless data bus switch 120 may be configured to manage one or more HPAL/DPAL wireless domains comprising wireless data bus switch 120 in an HPAL mode and one or more DPAL mode switches.

For example, in such HPAL mode, HMAC 134 and LMAC 160 may be configured by SME 112 and/or eSME 132 to perform MAC related tasks consistent with the selected HPAL mode. In like manner, PALCP 136 and configurable PALDP 140 may be configured to use information provided by SME 112 and/or eSME 132 to place themselves in a corresponding HPAL operational mode, for example, and build up necessary operational parameters, such as a route mapping table for example, to manage a wireless domain of DPAL mode switches.

In addition to the above, eSME 132 may also be configured to detect when wireless data bus switch 120 should be placed into a DPAL mode, such as when wireless data bus switch 120 is coupled to an end point or is not coupled to a host device, for example, or when wireless data bus switch 120 will be configured to participate in a wireless domain managed by another HPAL mode switch. Upon such detection, eSME 132 may be configured to place wireless data bus switch 120 into a DPAL mode. While in a DPAL mode, eSME 132 may be configured to function without interaction with an external SME such as SME 112, for example. As such, while in a DPAL mode, and in addition to the functionality described above, eSME 132 of wireless data bus switch 120 may be configured to manage HMAC 134, LMAC 160, PALCP 136 and PALDP 140, to collect characteristics of end points connected to data bus 190, and to measure current workload, power source mode and wireless link condition statistics and request bandwidth accordingly. As such, eSME 132 of wireless data bus switch 120 may be configured to couple to a wireless domain managed by a HPAL mode switch.

For example, in such DPAL mode, HMAC 134 and LMAC 160 may be configured by eSME 132 to perform MAC related tasks consistent with the selected DPAL mode. In like manner, PALCP 136 and configurable PALDP 140 may be configured to use information provided by eSME 132 to place themselves in a corresponding DPAL operational mode, for example, and build up necessary operational parameters, such as a route mapping table for example, to participate in a wireless domain managed by an HPAL mode switch.

In some embodiments, detection of circumstances indicating an HPAL mode or a DPAL mode may be performed at initialization of wireless data bus switch 120, as indicated above, but in other embodiments, wireless data bus switch 120 may be configured to perform such detection periodically, for example, or upon request by SME 112, such as before attempting to join a wireless domain managed by an HPAL mode switch, for instance. In addition, coupling to a host device and/or an end point may or may not comprise physical connections, for example. In some embodiments, such detection capability may be omitted in order to save resources of processor 130, SHM 180, host CPU 110 or the like, and wireless data bus switch may be configured to always be in an HPAL or DPAL mode. Although the above description indicates that eSME 132 may perform detection and mode selection operations, in other embodiments, SME 112 may be configured to participate in both detection and mode selection operations. In addition, even when in HPAL mode, wireless data bus switch 120 may be configured to utilize eSME 132 as the primary software module for managing ongoing operations of wireless data bus switch 120, for example, thereby limiting reliance on an uncongested data link to SME 112.

Thus, embodiments of the present inventive concepts advantageously provide flexibility by functioning in either an HPAL or DPAL mode, high data throughput by supporting up to 7 Gbps data streams, and power savings by being able to selectively power off modules when there is no data traffic. Moreover, such embodiments may provide an extended product life by including software modules that may be periodically updated by a manufacturer, for example, to correct errors and add functionality, for instance.

Moving to FIGS. 2 through 5, these Figures illustrate transmit and receive data flows for HPAL (e.g., FIGS. 2 and 3) and DPAL (e.g., FIGS. 4 and 5) mode dynamically configurable data bus switches, according to embodiments of the present inventive concepts. In some embodiments, one dynamically configurable wireless data bus switch, such as wireless data bus switch 120 in FIG. 1 for example, may be configured to be capable of entering into each of the states depicted in FIGS. 2 through 5, for example, at different times during normal operation. With respect to FIG. 2, SME 212, processor 230, HMAC security agent 234, HMAC MLME/scheduler 235, switch HPAL control plane (SWFICP) 236, and configurable switch HPAL data plane (SWHDP) 240 may correspond respectively to SME 112, processor 130, HMAC 134, MLME 135, PALCP 136 and configurable PALDP 140 of FIG. 1; e.g., each corresponding module may function similarly and comprise the same structure, arrangement and materials as its counterpart. In particular, root complex (RC) 292 of FIG. 2 may correspond to data bus link 118 in FIG. 1, where upstream port 242 may provide access to a PCIe data bus corresponding to data bus 190 in FIG. 1, for example.

As noted above, FIG. 2 illustrates a detailed data flow 200 for a dynamically configurable wireless data bus switch, similar to wireless data bus switch 120 in FIG. 1, that has been placed into an HPAL mode and is configured to translate data bus data packets arriving at upstream port 242 into PAL data packets ready to be sent to an LMAC from LMAC queue 244. For example, with respect to the embodiment shown in FIG. 2, configurable SWHDP 240 includes upstream port 242, LMAC queue 244, route map table 246, transmit status 248, decoder 250, configurable queue block 252, egress arbiter 254 and data bus flow control 258. Looking at steps 201, 202 and 203, decoder 250 may be configured to accept a data bus data packet from upstream port 242, assign a PAL serial number to retain proper order, and push the data bus data packet and the assigned serial number into configurable queue block 252. Configurable queue block 252 may then provide such queued data packets to egress arbiter 254 which encapsulates queued data packets into PAL data packets according to, for example, the source queue, serial number and routing information provided by route map table 246. After encapsulation by egress arbiter 254, PAL data packets are provided to LMAC queue 244 for transmission to an LMAC and over a coupled wireless link to other wireless data bus switches, for example. Additionally, as egress arbiter 254 provides PAL data packets to LMAC queue 244, egress arbiter may also provide flow control data, for example, to root complex 292 through flow control 258, for instance, to seamlessly accept transmission data packets from a coupled data bus. HPAL data plane (HDP) status 248 may be configured to notify modules in processor 230 that there is data to be transmitted, for example.

Figure 2:
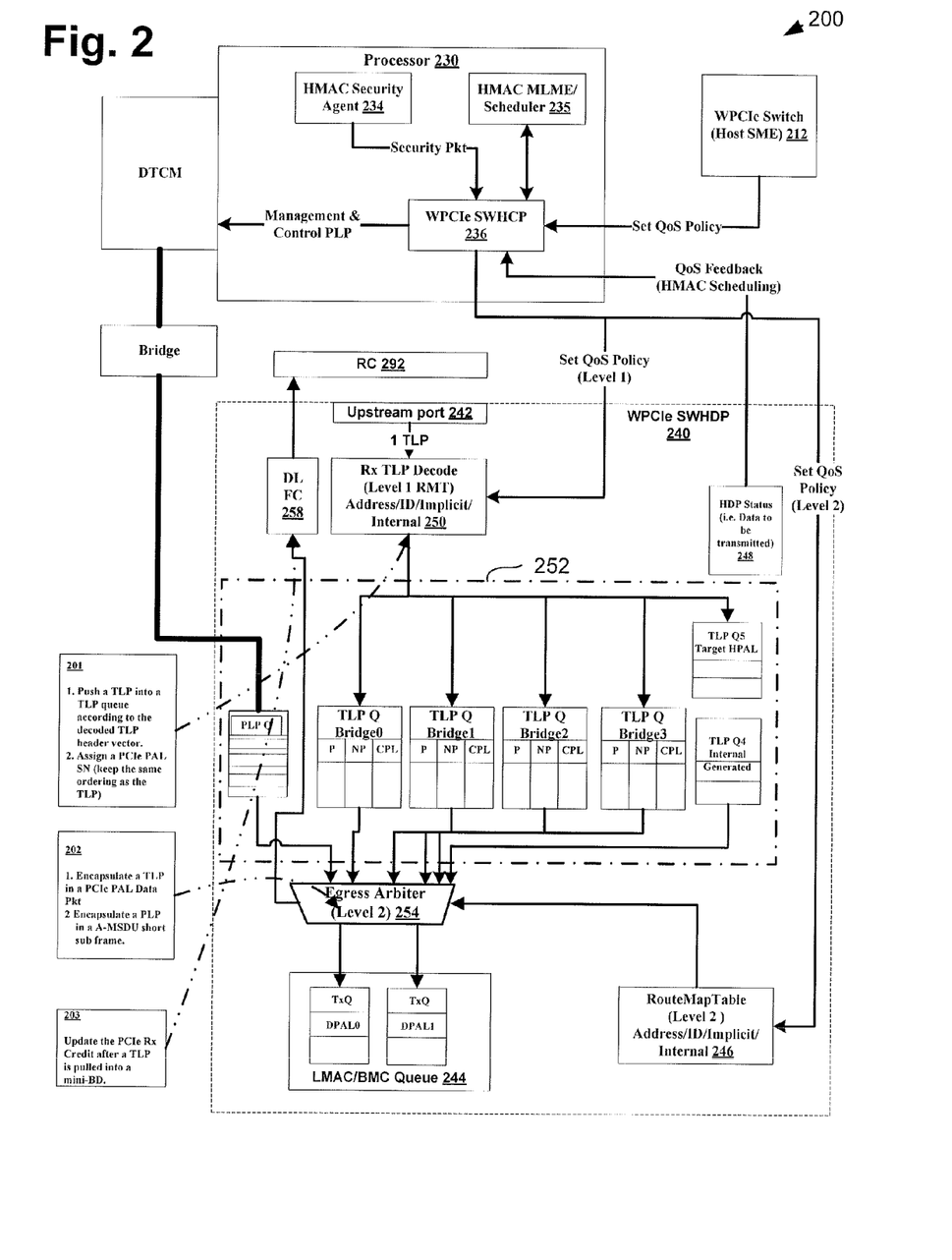
FIG. 2 presents a dataflow diagram for a dynamically configurable wireless data bus switch, according to one embodiment of the present invention.

As can be seen from FIG. 2, each of decoder 250, configurable queue block 252 and egress arbiter 254, and thus configurable SWHDP 240, may be dynamically configurable by software modules residing in processor 230, for example. In particular, configurable SWHDP 240, which may be coupled to processor 230 over multiple data links, may be dynamically configurable by SWHCP 236 of processor 230, for example. For instance, decoder 250 may be periodically provided with QoS information by SWHCP 236 that causes decoder 250 to push data bus data packets into a particular queue in configurable queue block 252, for example, in order to take advantage of processing assigned to a particular queue, for example. Moreover, SWHCP 236 may also dynamically configure configurable queue block 252 to, for example, allocate more of its resources to a particular queue to facilitate higher bandwidth processing, for instance. In addition to the above, SWHCP 236 may provide further QoS information to route map table 246 to configure egress arbiter 254 to encapsulate data packets with emphasis on reducing latency or increasing throughput, for example. Although each of decoder 250, configurable queue block 252 and egress arbiter 254 are shown in FIG. 2 as receiving QoS information from processor 230, and even though some receive such information through interstitial modules, in other embodiments, any modules within processor 230 may configure each of decoder 250, configurable queue block 252 and egress arbiter 254, and thus configurable SWHDP 240 utilizing information other than QoS information, and other data links than those explicitly shown in FIG. 2.

Also shown in FIG. 2 is a data flow for control packets transmitted from processor 230, where such control packets may be sent to a data tightly coupled memory (DTCM) and then bridged to a control packet queue dynamically allocated within configurable queue block 252, by processor 230 for example, much as data bus data packet queues are dynamically allocated as described above. Then, such queued control packets may be encapsulated by egress arbiter 254 into PAL control packets that are then queued for transmission to an LMAC by LMAC queue 244.

Figure 3:
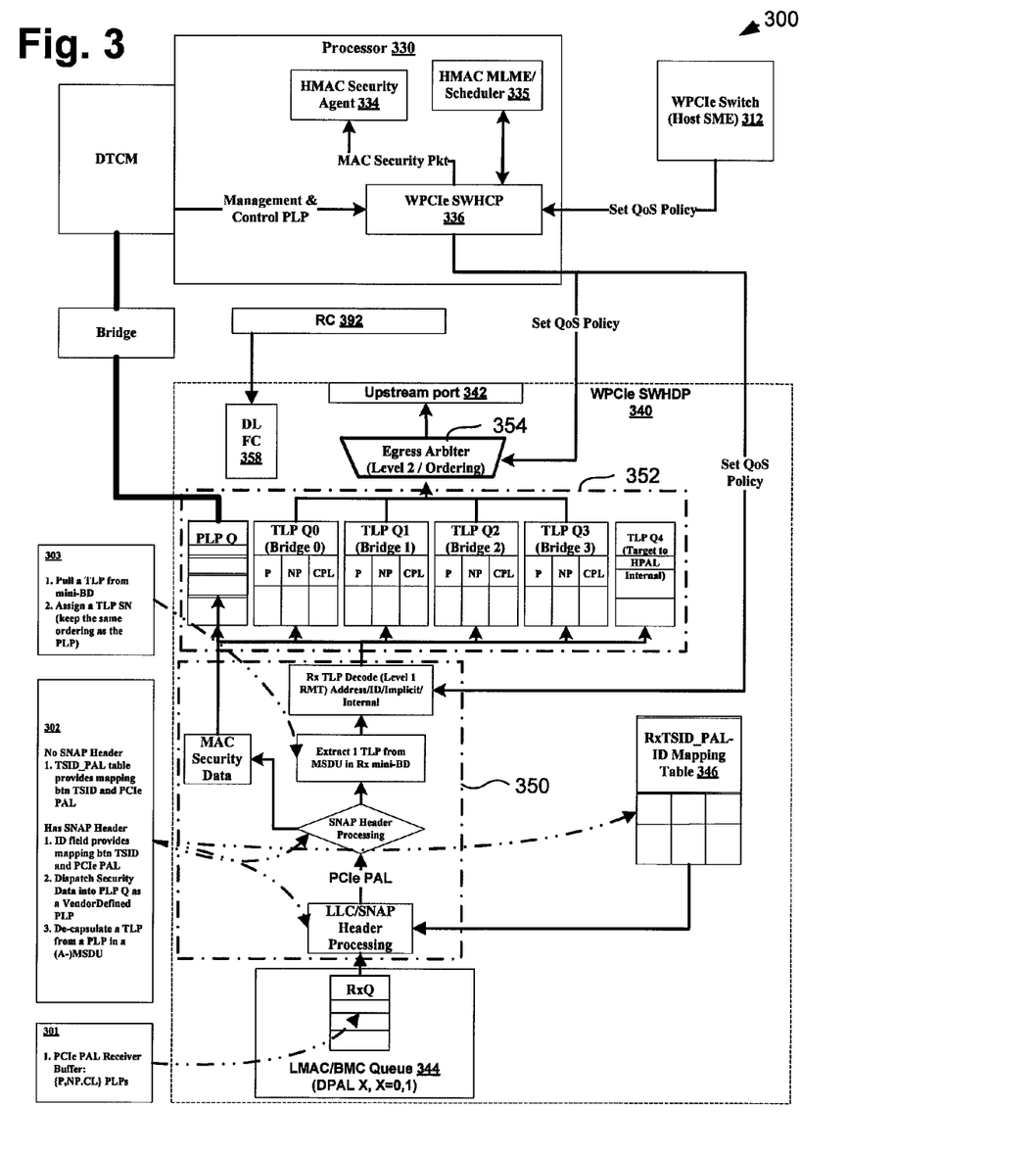
FIG. 3 presents a dataflow diagram for a dynamically configurable wireless data bus switch, according to one embodiment of the present invention.

While in an HPAL mode, a dynamically configurable wireless data bus switch according to the present inventive concepts may also be configured to receive data, as is illustrated by data flow 300 in FIG. 3. With respect to FIG. 3, SME 312, processor 330, HMAC security agent 334, HMAC MLME/scheduler 335, SWHCP 336, configurable SWHDP 340, upstream port 342, LMAC queue 344, route map table 346, decoder 350, configurable queue block 352, egress arbiter 354, flow control 358, and root complex 392 may correspond respectively to SME 212, processor 230, HMAC security agent 234, HMAC MLME/scheduler 235, SWHCP 236, configurable SWHDP 240, upstream port 242, LMAC queue 244, route map table 246, decoder 250, configurable queue block 252, egress arbiter 254, flow control 258, and root complex 292 of FIG. 2; e.g., each corresponding module may function similarly and comprise the same structure and materials as its counterpart, except that each module is configured to facilitate translating PAL data packets arriving at LMAC queue 344 into data bus data packets provided to a data bus by upstream port 342 or PAL control packets into control packets provided to processor 330.

For example, looking at steps 301 through 303 of FIG. 3, configurable SWHDP 340 may be configured to queue arriving PAL data and control packets in LMAC queue 344, which then provides such queued PAL packets to decoder 350. Decoder 350 may be dynamically configured, by SWHCP 336 for example, to decode provided PAL packets according to header information, QoS information, and route mapping data, in addition to other information, then de-capsulate data bus data packets and control packets, assign serial numbers for ordering, and then push such packets into queues dynamically allocated within configurable queue block 352. Similar to configurable queue block 252 of FIG. 2 above, configurable queue block 352 may be dynamically configured by SWHCP 336 to allocate more of its resources to a particular queue to facilitate higher bandwidth processing, for example, or other queue based processing, such as control packet routing for example. Queued data bus data packets may then be provided to egress arbiter 354 for ordering and other processing dynamically configurable by SWHCP 336, for example, such as QoS ordering facilitated through QoS information provided by SWHCP 336.

As above, although each of decoder 350, configurable queue block 352 and egress arbiter 354 are shown as receiving QoS information from processor 330, and even though some receive such information through interstitial modules, in other embodiments, any modules within processor 330 may configure each of decoder 350, configurable queue block 352 and egress arbiter 354, and thus configurable SWHDP 340, utilizing information other than QoS information, and other data links than those explicitly shown in FIG. 3.

Figure 4:
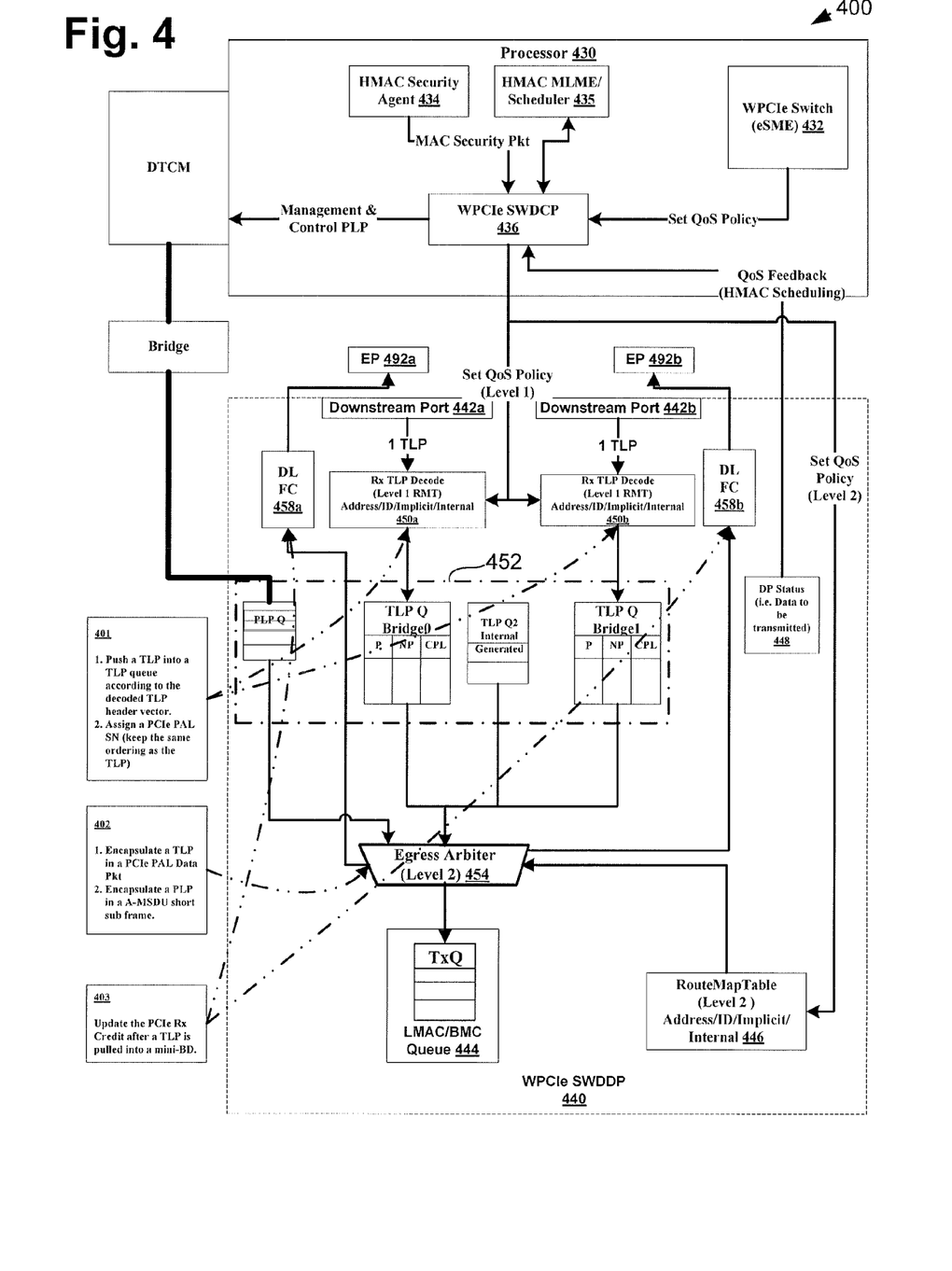
FIG. 4 presents a dataflow diagram for a dynamically configurable wireless data bus switch, according to one embodiment of the present invention.

Turning to FIG. 4, FIG. 4 illustrates a detailed data flow 400 for a dynamically configurable wireless data bus switch, similar to wireless data bus switch 120 in FIG. 1, that has been placed into a DPAL mode and is configured to translate data bus data packets arriving at downstream ports 442*a* and 442*b* and control packets provided by processor 430 into PAL data packets and PAL control packets, respectively, that are ready to be sent to an LMAC from LMAC queue 444. As is clear from steps 401 through 403 and a general layout of switch DPAL data plane (SWDDP) 440, data flow 400 of FIG. 4 largely corresponds to data flow 200 of FIG. 2, except that SME 212 in FIG. 2 has been replaced with eSME 432 residing in processor 430 of FIG. 4, and upstream port 242, decoder 250, flow control 258 and root complex 292 has been replaced with downstream ports 442*a* and 442*b*, decoders 450*a* and 450*b*, flow controls 458*a* and 458*b*, and end points 492*a* and 492*b*. Additionally, in the embodiment illustrated by FIG. 4, configurable queue block 452 is shown as configured with fewer configured queues, and LMAC queue 444 is shown as narrower than, for example, LMAC queue 244 in FIG. 2. These changes illustrate different physical connections and concomitant resource allocations that may be configured to facilitate a particular mode, such as a HPAL or DPAL mode, for example.

For instance, as shown in FIG. 2, an HPAL mode switch may be configured to provide a wireless data bus extension from one data bus to multiple DPAL mode switches, and so in that embodiment, only one upstream port 242 may be allocated to the data bus, but many queues may be allocated in configurable queue block 252, for example, to facilitate high bandwidth connections between endpoints connected to a data bus accessed through upstream port 242 and multiple DPAL mode switches, for example. By contrast, as shown in FIG. 4, a DPAL mode switch may be configured to provide a wireless data bus extension from multiple data buses, with one end point per data bus, for example, to only one HPAL mode switch, for instance, and so allocate available modules within SWDDP 440, for example, differently. For example, in some embodiments, a wireless data bus switch according to the present inventive concepts, when in a DPAL mode, may be able to couple to up to 32 separate data buses/end points substantially simultaneously, and coordinate resource allocations according to individual bandwidth needs and the like. In one embodiment, end points 492*a* and 492*b* may comprise any PCIe devices, for example, and downstream ports 442*a* and 442*b* may provide access to a PCIe data bus interface of end points 492*a* and 492*b*. Alternatively, when in HPAL mode, a wireless data bus switch according to embodiments of the present inventive concepts may manage up to 32 DPAL mode switches and end points (combined).

It is important to reiterate that one dynamically configurable wireless data bus switch according to the present inventive concepts may be configured to exhibit the characteristics of both data flow 200 of FIG. 2 and data flow 400 of FIG. 4, depending on a selected mode of the wireless data bus switch and other management decision made by, for example, modules within processor 230 or 430.

Figure 5:
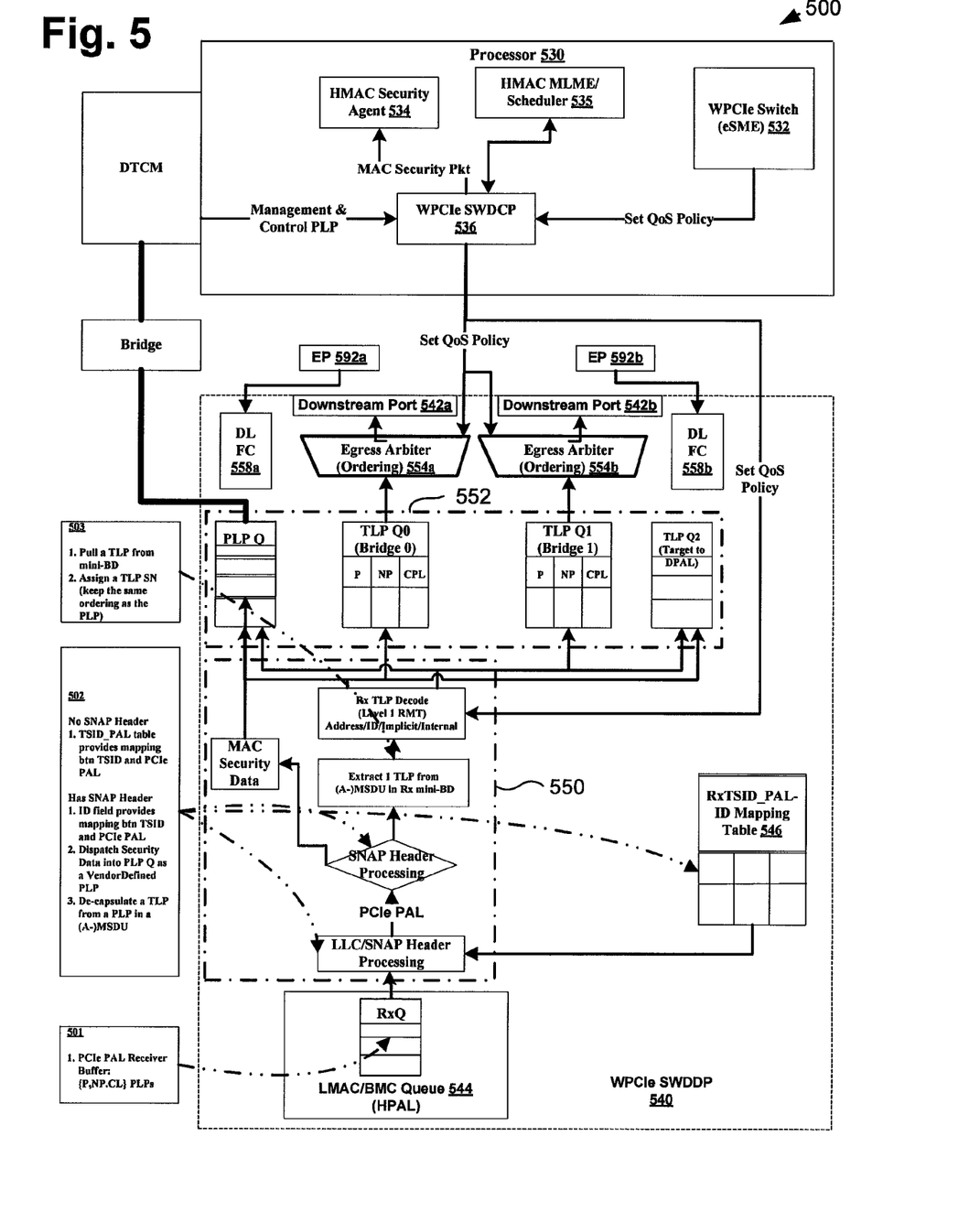
FIG. 5 presents a dataflow diagram for a dynamically configurable wireless data bus switch, according to one embodiment of the present invention.

FIG. 5, like FIG. 4, illustrates a detailed data flow 500 for a dynamically configurable data bus switch that has been placed into a DPAL mode, but that is configured to translate PAL data packets and PAL control packets received by LMAC queue 544 into data bus data packets and control packets provided to downstream ports 542*a* and 542*b* and processor 530, respectively. Data flow 500 of FIG. 5 largely corresponds to data flow 300 of FIG. 3, with differences similar to those differences between FIGS. 4 and 2, and with similar explanations as to why those differences may exist in various embodiments of the present inventive concepts.

When a wireless data bus switch according to the present inventive concepts is in an HPAL mode, a corresponding SWHCP, such as SWHCP 236 in FIG. 2 and SWHCP 336 in FIG. 3 for example, may be configured to process various management or control packets, to manage interfaces to an SME, eSME, HMAC, LMAC and configurable SWHDP, and to control data flow from a root complex and/or data bus to end points coupled to a DPAL mode wireless data bus switch, for example. Moreover, a SWHCP may additionally be configured to manage any DPAL mode switches, using transmitted and received control packets for example, that are under its associated wireless domain. Additionally, a corresponding configurable SWHDP, such as configurable SWHDP 240 in FIG. 2 and configurable SWHDP 340 in FIG. 3 for example, may be configured to process data bus data packets, control packets, PAL data packets and PAL control packets, and to manage interfaces to a root complex, an upstream port, an SWHCP, and all LMAC, for example.

As discussed above, a wireless data bus switch in an HPAL mode may comprise both an SME residing in an external host CPU, such as SME 212 in FIG. 2 and SME 312 in FIG. 3 for example, and, in some embodiments, an eSME residing in a processor of the wireless data bus switch, such as eSME 132 in FIG. 1, for example. Both the external SME and the eSME, which may be referred to jointly as an SME of a wireless data bus switch, may be configured to provide an interface for users to administer, configure, provision, and collect various statistics from a corresponding HPAL mode switch, and may be configured to manage interfaces to a corresponding SWHCP, HMAC, LMAC and configurable SWHDP. As such, the external SME and the eSME may be configured to manage one or more HPAL/DPAL wireless domains, as described above. Furthermore, a corresponding SWHDP (e.g., a PALDP) may be dynamically configurable by each of the SME, the eSME and a corresponding SWHCP (e.g., a PALCP), for example, to facilitate management of one or more HPAL/DPAL wireless domains, for example. As such, where a corresponding SWHDP (e.g., a PALDP) comprises a decoder, a configurable queue block, and an egress arbiter, such as SWHDP 240 comprising decoder 250, configurable queue block 252 and egress arbiter 254 in FIG. 2 for example, each of the decoder, configurable queue block and egress arbiter may be dynamically configurable by each of the SME, the eSME and a corresponding SWHCP (e.g., a PALCP).

When a wireless data bus switch according to the present inventive concepts is instead in a DPAL mode, a corresponding SWDCP, such as SWDCP 436 in FIG. 4 and SWDCP 536 in FIG. 5 for example, may be configured to process various management or control packets and to manage interfaces to an SME, eSME, HMAC, LMAC and configurable SWDDP, but may also be configured to discover available HPAL mode switches to facilitate joining a wireless domain, for example. A corresponding configurable SWDDP, such as configurable SWDDP 440 in FIG. 4 and configurable SWDDP 540 in FIG. 5 for example, may be configured to process data bus data packets, control packets, PAL data packets and PAL control packets, and to manage interfaces to downstream ports/end points, an SWDCP, and an LMAC, for example.

A wireless data bus switch in a DPAL mode may lack an external SME and comprise only an eSME residing in a processor of the wireless data bus switch, such as eSME 432 in FIG. 4 and eSME 532 in FIG. 5, for example. The eSME of a DPAL mode switch may be configured to provide an interface for users to administer, configure, provision, and collect various statistics from the DPAL mode switch, through an HPAL mode switch managing a wireless domain of the DPAL mode switch, for example. Additionally, the eSME of a DPAL mode switch may also be configured to decide when to join a wireless domain managed by a specific HPAL mode switch, for example, and/or which of a plurality of wireless domains to join. Furthermore, a corresponding SWDDP (e.g., a PALDP) may be dynamically configurable by the eSME and a corresponding SWDCP (e.g., a PALCP), for example, to facilitate joining one or more wireless domains, for example. As such, where a corresponding SWDDP (e.g., a PALDP) comprises a decoder, a configurable queue block, and an egress arbiter, such as SWDDP 440 comprising decoders 450a and 450b, configurable queue block 452 and egress arbiter 454 in FIG. 4 for example, each of the decoder, configurable queue block and egress arbiter may be dynamically configurable by the eSME and a corresponding SWDCP (e.g., a PALCP).

Although functionalities of various modules of a wireless data bus switch according to the present inventive concepts may overlap, particularly with respect to management functionalities described above, such modules may be configured to form a hierarchy based on authority and efficiency, for example, such that, for instance, an SME may be relatively slow and inefficient yet be able to overrule all other modules with respect to wireless domain management, for example. In one embodiment, a hierarchy may comprise an SME, a PALCP, and a PALDP, for example, in order of decreasing authority and increasing efficiency and speed.

It is important to note that the preceding discussion with respect to FIGS. 2 through 5 describes mode-specific functionalities of a PALCP and a PALDP (e.g., a SWHCP and SWDCP, and a SWHDP and SWDDP) that may supplement the more general functionalities described above with respect to FIG. 1, for example.

Thus, in light of the detailed data flows provided in FIGS. 2 through 5, embodiments of the present inventive concepts advantageously provide the flexibility, high data throughput, and power savings noted above, and additionally provide scalability by being capable of managing many DPAL mode switches and associated downstream ports when in HPAL mode, and similarly many downstream ports when in DPAL mode, and may also provide intelligent routing by incorporating route mapping and QoS service classification, as outlined above.

Figure 6:
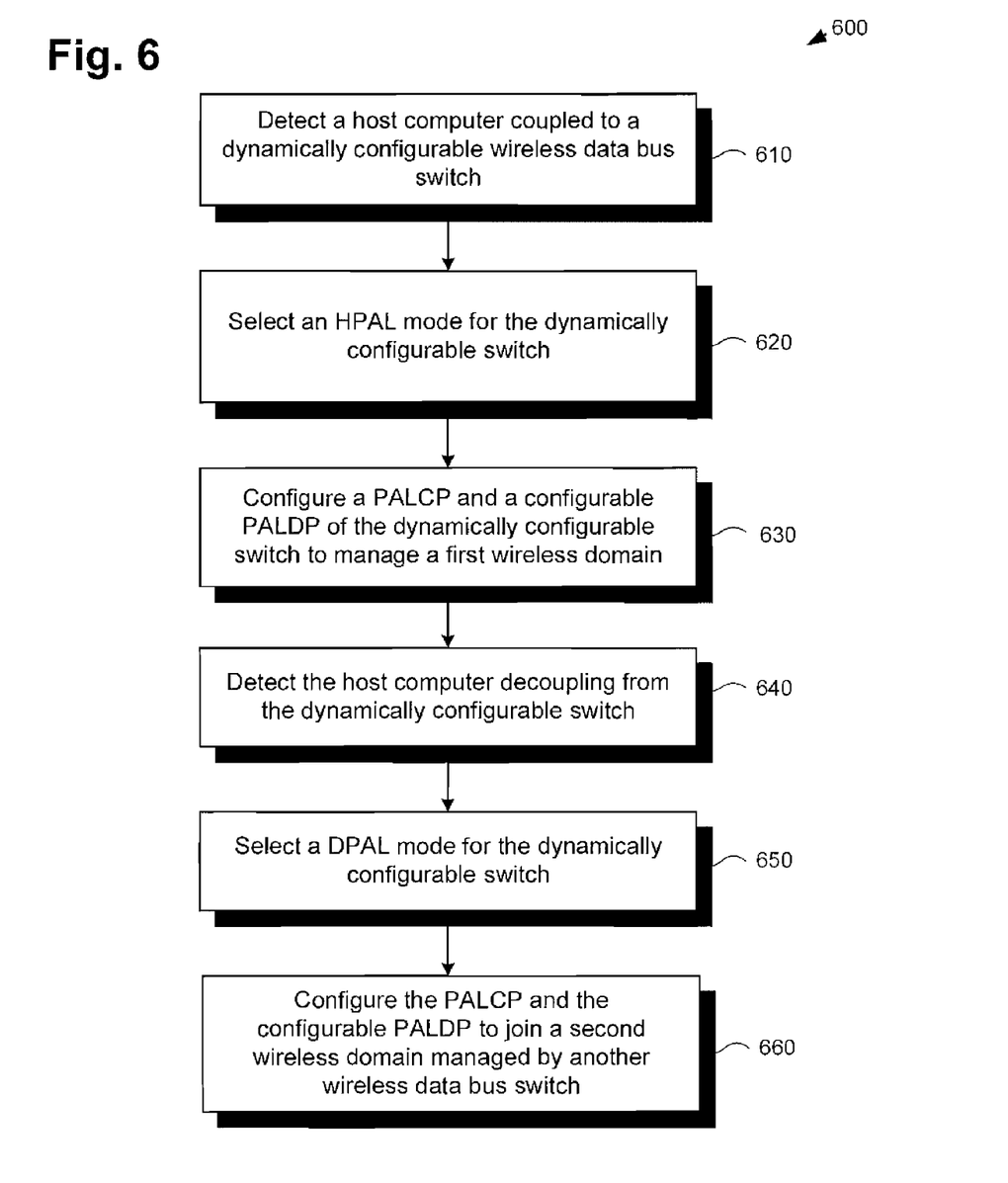
FIG. 6 presents a flowchart illustrating a method for dynamically configuring a wireless data bus switch, according to one embodiment of the present invention.

Turning to FIG. 6, FIG. 6 shows flowchart 600 illustrating a method for execution by a processor of a dynamically configurable wireless data bus switch for coupling a wireless link to a data bus. Certain details and features have been left out of flowchart 600 that are apparent to a person of ordinary skill in the art. For example, a step may consist of one or more substeps or may involve specialized equipment or materials, as known in the art. Steps 610 through 660 indicated in flowchart 600 are sufficient to describe one embodiment of the present invention; however, other embodiments of the invention may make use of steps different from those shown in flowchart 600. It is noted that FIG. 1 illustrates a system capable of performing the method of flowchart 600, and so steps 610 through 660 are described with reference to system 100 in FIG. 1.

Referring now to step 610 of the method embodied in FIG. 6, step 610 of flowchart 600 comprises processor 130 detecting a host computer coupled to wireless data bus switch 120. For example, any module of data bus switch 120 may be configured to detect a presence of host CPU 110, for example, or SME 112. As noted above, such detection may take place at initialization of wireless data bus switch 120, for example, or at any time subsequent to initialization.

Continuing with step 620 in FIG. 6, step 620 of flowchart 600 comprises processor 130 selecting an HPAL mode for wireless data bus switch 120. As explained above, such selection may include forming an interface between eSME 132 and SME 112, for example, and/or initializing data bus link 118 in order to access data bus 190, for instance.

Moving to step 630 in FIG. 6, step 630 of flowchart 600 comprises processor 130 configuring PALCP 136 and configurable PALDP 140 of wireless data bus switch 120 to manage a first wireless domain. As described previously, SME 112 and eSME 132 may collaboratively manage and configure PALCP 136 and configurable PALDP 140 to create and administer a wireless domain managed by wireless data bus switch 120. For example, PALCP 136 may be configured to provide control packets to configurable PALDP 140, which may itself be configured to queue, encapsulate, and manage transmission of the control packets (e.g., as PAL control packets) to DPAL mode switches under a wireless domain managed by wireless data bus switch 120. In some embodiments, this step may include configuring a configurable queue block of configurable PALDP 140 to allocate a portion of the configurable queue block with data packets transmitted between wireless link 114 and data bus 190, for example, or with control packets transmitted between wireless link 114 and processor 130, as described above. In such embodiments, the allocated portion of the configurable queue block may correspond to a bandwidth requirement for either the data packets or the control packets.

Referring to step 640 of the method embodied in FIG. 6, step 640 of flowchart 600 comprises processor 130 detecting a host computer decoupling from wireless data bus switch 120. For example, any module of data bus switch 120 may be configured to detect an absence of host CPU 110, for example, or SME 112. As with detecting a coupled host computer, detecting decoupling may take place at initialization of wireless data bus switch 120, for example, or at any time subsequent to initialization.

Continuing with step 650 in FIG. 6, step 650 of flowchart 600 comprises processor 130 selecting a DPAL mode for wireless data bus switch 120. As explained above, such selection may include initializing data bus link 118 in order to access and characterize an end point coupled to data bus 190, for example. Alternatively, step 650 may comprise simply detecting an absence of a host computer, or even a presence of an end point, for example, where a host computer is never coupled to wireless data bus switch 120, for instance.

Moving to step 660 in FIG. 6, step 660 of flowchart 600 comprises processor 130 configuring PALCP 136 and configurable PALDP 140 of wireless data bus switch 120 to join a second wireless domain managed by another wireless data bus switch, which may or may not be similar to wireless data bus switch 120. Since SME 112 and host CPU 110 are not present in this embodiment, eSME 132 alone may manage and configure PALCP 136 and configurable PALDP 140 to join a second wireless domain, for example, managed by another wireless data bus switch, as is described above. For example, PALCP 136 may be configured to provide control packets to configurable PALDP 140, which may itself be configured to queue, encapsulate, and manage transmission of the control packets (e.g., as PAL control packets) to an HPAL mode switch managing the second wireless domain, for example, to negotiate wireless link characteristics and the like. As with step 630 above, in some embodiments, this step may include configuring a configurable queue block of configurable PALDP 140 to allocate a portion of the configurable queue block with data packets transmitted between wireless link 114 and data bus 190, for example, or with control packets transmitted between wireless link 114 and processor 130, as described above. In such embodiments, the allocated portion of the configurable queue block may correspond to a bandwidth requirement for either the data packets or the control packets.

Thus, various embodiments of the present invention provide systems and methods for coupling a wireless link to a data bus using a dynamically configurable wireless data bus switch. In particular, embodiments of the present inventive concepts may be configured to provide architectural flexibility, scalability, high data throughput, intelligent routing, and power savings, as described above, which can lead to cost savings when developing devices leveraging wireless data bus extensions. For example, by incorporating dynamically configurable queue blocks, embodiments can be scaled to support many different combinations of DPAL mode switches and end points without requiring expensive redesigns for each specific combination. Additionally, in some embodiments, an SME, eSME or PALCP, for example, may collect constantly updated information about link conditions, workloads and end point characteristics, for example, and combine them with efficient direct memory mechanisms, for example, to leverage substantially all of a wireless link bandwidth, thus maximizing data throughput while retaining the aforementioned configurable flexibility.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A dynamically configurable wireless data bus (WDB) switch for coupling a data bus to a wireless link, the dynamically configurable WDB switch comprising:
   a configurable protocol adaption layer data plane (PALDP) providing a first interface to the data bus;
   a processor configured to execute a protocol adaption layer control plane (PALCP); and
   the configurable PALDP being coupled to the processor and dynamically configurable by the PALCP;
   wherein the dynamically configurable WDB switch is configured to be in a device protocol adaption layer DPAL mode, the DPAL mode allowing the dynamically configurable WDB switch to couple to a wireless domain managed by a host protocol adaption layer (HPAL) mode switch.

2. The dynamically configurable WDB switch of claim 1, wherein the processor is further configured to execute an embedded station management entity (eSME);
   the configurable PALDP being dynamically configurable by the PALCP and the eSME.

3. The dynamically configurable WDB switch of claim 1, wherein the dynamically configurable WDB switch is coupled to a host computer;
   the configurable PALDP being dynamically configurable by the PALCP and a station management entity (SME) that is executable by the host computer.

4. The dynamically configurable WDB switch of claim 1, further comprising a lower medium access control (LMAC) coupled to the configurable PALDP and providing a second interface to the wireless link.

5. The dynamically configurable WDB switch of claim 1, wherein the configurable PALDP comprises a decoder, a configurable queue block, and an egress arbiter;
   each of the decoder, the configurable queue block, and the egress arbiter being dynamically configurable by the PALCP.

6. The dynamically configurable WDB switch of claim 1, wherein the configurable PALDP is configured to process data packets transmitted between the wireless link and the data bus and to process control packets transmitted between the wireless link and the processor.

7. A dynamically configurable wireless data bus (WDB) switch for coupling a data bus to a wireless link, the dynamically configurable WDB switch comprising:
   a configurable protocol adaption layer data plane (PALDP) providing a first interface to the data bus;
   a processor configured to execute a protocol adaption layer control plane (PALCP); and
   the configurable PALDP being coupled to the processor and dynamically configurable by the PALCP;
   wherein the dynamically configurable WDB switch is configured to be in a host protocol adaption layer (HPAL) mode, the HPAL mode allowing the dynamically configurable WDB switch to manage a wireless domain comprising the HPAL mode switch and one or more device protocol adaption layer (DPAL) mode switches coupled to the HPAL mode switch.

8. A dynamically configurable wireless data bus (WDB) switch for coupling a data bus to a wireless link, the WDB switch comprising:
   a configurable protocol adaption layer data plane (PALDP) providing a first interface to the data bus;
   a lower medium access control (LMAC) coupled to the configurable PALDP and providing a second interface to the wireless link;
   an executable station management entity (SME);
   a processor configured to execute a protocol adaption layer control plane (PALCP); and
   the configurable PALDP being coupled to the processor and dynamically configurable by the SME and the PALCP;
   wherein the dynamically configurable WDB switch is configured to be in a device protocol adaption layer (DPAL) mode, the DPAL mode allowing the dynamically configurable WDB switch to couple to a wireless domain managed by a host protocol adaption layer (HPAL) mode switch.

9. The dynamically configurable WDB switch of claim 8, wherein the SME comprises an embedded station management entity (eSME) and the processor is further configured to execute the eSME.

10. The dynamically configurable WDB switch of claim 8, wherein the dynamically configurable WDB switch is coupled to a host computer and the SME comprises an SME that is executable by the host computer.

11. The dynamically configurable WDB switch of claim 8, wherein the configurable PALDP, the LMAC and the processor are integrated into the same semiconductor die.

12. The dynamically configurable WDB switch of claim 8, wherein the configurable PALDP comprises a decoder, a configurable queue block, and an egress arbiter;

each of the decoder, the configurable queue block, and the egress arbiter being dynamically configurable by the SME and the PALCP.

13. The dynamically configurable WDB switch of claim 8, wherein the configurable PALDP is configured to process data packets transmitted between the wireless link and the data bus and to process control packets transmitted between the wireless link and the processor.

14. A dynamically configurable wireless data bus (WDB) switch for coupling a data bus to a wireless link, the WDB switch comprising:
 a configurable protocol adaption layer data plane (PALDP) providing a first interface to the data bus;
 a lower medium access control (LMAC) coupled to the configurable PALDP and providing a second interface to the wireless link;
 an executable station management entity (SME);
 a processor configured to execute a protocol adaption layer control plane (PALCP); and
 the configurable PALDP being coupled to the processor and dynamically configurable by the SME and the PALCP;
 wherein the dynamically configurable WDB switch is configured to be in a host protocol adaption layer (HPAL) mode, the HPAL mode allowing the dynamically configurable WDB switch to manage a wireless domain comprising the HPAL mode switch and one or more device protocol adaption layer (DPAL) modes witches coupled to the HPAL mode switch.

15. The dynamically configurable WDB switch of claim 8, wherein the wireless link comprises a 60 GHz wireless link.

16. The dynamically configurable WDB switch of claim 8, wherein the data bus comprises a peripheral component interconnect express (PCIe) data bus.

17. A method for execution by a processor of a dynamically configurable wireless data bus (WDB) switch for coupling a wireless link to a data bus, the method comprising:
 detecting a host computer coupled to the dynamically configurable WDB switch;
 selecting a host protocol adaption layer (HPAL) mode for the dynamically configurable WDB switch;
 configuring a protocol adaption layer control plane (PALCP) and a configurable protocol adaption layer data plane (PALDP) of the dynamically configurable WDB switch to manage a first wireless domain;
 detecting the host computer decoupling from the dynamically configurable WDB switch;
 selecting a device protocol adaption layer (DPAL) mode for the dynamically configurable WDB switch; and
 configuring the PALCP and the configurable PALDP to join a second wireless domain managed by another wireless data bus switch.

18. A method for execution by a processor of a dynamically configurable wireless data bus (WDB) switch for coupling a wireless link to a data bus, the method comprising:
 detecting a host computer coupled to the dynamically configurable WDB switch;
 selecting a host protocol adaption layer (HPAL) mode for the dynamically configurable WDB switch:
 configuring a protocol adaption layer control plane (PALCP) and a configurable protocol adaption layer data plane (PALDP) of the dynamically configurable WDB switch to manage a first wireless domain; and
 configuring a configurable queue block of the configurable PALDP to allocate a portion of the configurable queue block with data packets transmitted between the wireless link and the data bus.

19. The method of claim 18, further comprising:
 the allocated portion of the configurable queue block corresponding to a bandwidth requirement for the data packets.

20. A method for execution by a processor of a dynamically configurable wireless data bus (WDB) switch for coupling a wireless link to a data bus, the method comprising:
 detecting a host computer coupled to the dynamically configurable WDB switch;
 selecting a host protocol adaption layer (HPAL) mode for the dynamically configurable WDB switch;
 configuring a protocol adaption layer control plane (PALCP) and a configurable protocol adaption layer data plane (PALDP) of the dynamically configurable WDB switch to manage a first wireless domain; and
 configuring a configurable queue block of the configurable PALDP to allocate a portion of the configurable queue block with control packets transmitted between the wireless link and the processor.

* * * * *